US00RE40755E

(19) United States
(12) Reissued Patent
McWethy et al.

(10) Patent Number: US RE40,755 E
(45) Date of Reissued Patent: Jun. 23, 2009

(54) NEEDLE-BEARING MEDICAL DEVICE

(75) Inventors: Robert T. McWethy, Colorado Springs, CO (US); Michael J. Botich, Reno, NV (US); Thor R. Halseth, Agorua, CA (US); Bradley M. Wilkinson, North Haledon, NJ (US)

(73) Assignee: MDC Investment Holdings, Inc., Wilmington, DE (US)

(21) Appl. No.: 29/285,896

(22) Filed: Apr. 13, 2007

Related U.S. Patent Documents

Reissue of:
(64) Patent No.: Des. 445,183
Issued: Jul. 17, 2001
Appl. No.: 29/122,595
Filed: Apr. 28, 2000

(51) LOC (9) Cl. ..... 24-02
(52) U.S. Cl. ..... D24/130; D24/147
(58) Field of Classification Search ..... D24/112, D24/130, 113, 146; 604/198, 192, 410, 195, 604/196, 110; 600/576, 578, 577, 583; 263/363, 263/365, 364
See application file for complete search history.

(56) References Cited

U.S. PATENT DOCUMENTS

| | | | | |
|---|---|---|---|---|
| 4,813,426 | A | 3/1989 | Haber | |
| 4,841,985 | A | 6/1989 | Wanamaker | 600/576 |
| 4,846,808 | A | 7/1989 | Haber | |
| 4,850,374 | A | 7/1989 | Diaz-Ramos | |
| 4,915,702 | A | 4/1990 | Haber | |
| 4,947,863 | A | 8/1990 | Haber | |
| 5,067,490 | A | 11/1991 | Haber | |
| 5,086,780 | A | 2/1992 | Schmitt | |
| 5,219,333 | A | 6/1993 | Sagstetter | |
| 5,353,806 | A | 10/1994 | Heinzelman et al. | 600/576 |
| 5,423,758 | A | 6/1995 | Shaw | |
| 5,810,775 | A | 9/1998 | Shaw | |
| 6,059,737 | A | 5/2000 | Crawford | 600/576 |
| D436,168 | S | 1/2001 | Wilkinson et al. | D24/130 |
| D436,169 | S | 1/2001 | Wilkinson et al. | D24/130 |

*Primary Examiner*—Robert M Spear
*Assistant Examiner*—Eric L Goodman
(74) *Attorney, Agent, or Firm*—Stoel Rives LLP

(57) CLAIM

The ornamental design for a needle-bearing medical device, as shown and described.

DESCRIPTION

FIG. 1 is a front perspective view of a needle-bearing medical device showing our new design;
FIG. 2 is a left-side view of the needle-bearing medical device shown in FIG. 1;
FIG. 3 is a right-side view of the needle-bearing medical device shown in FIG. 1;
FIG. 4 is a front elevational view of the needle-bearing medical device shown in FIG. 1, with the back view being substantially a mirror of the front view;
FIG. 5 is a top plan view of the needle-bearing medical device shown in FIG. 1; and,
FIG. 6 is a bottom plan view of the needle-bearing medical device shown in FIG. 1.

1 Claim, 2 Drawing Sheets

Figure 1:
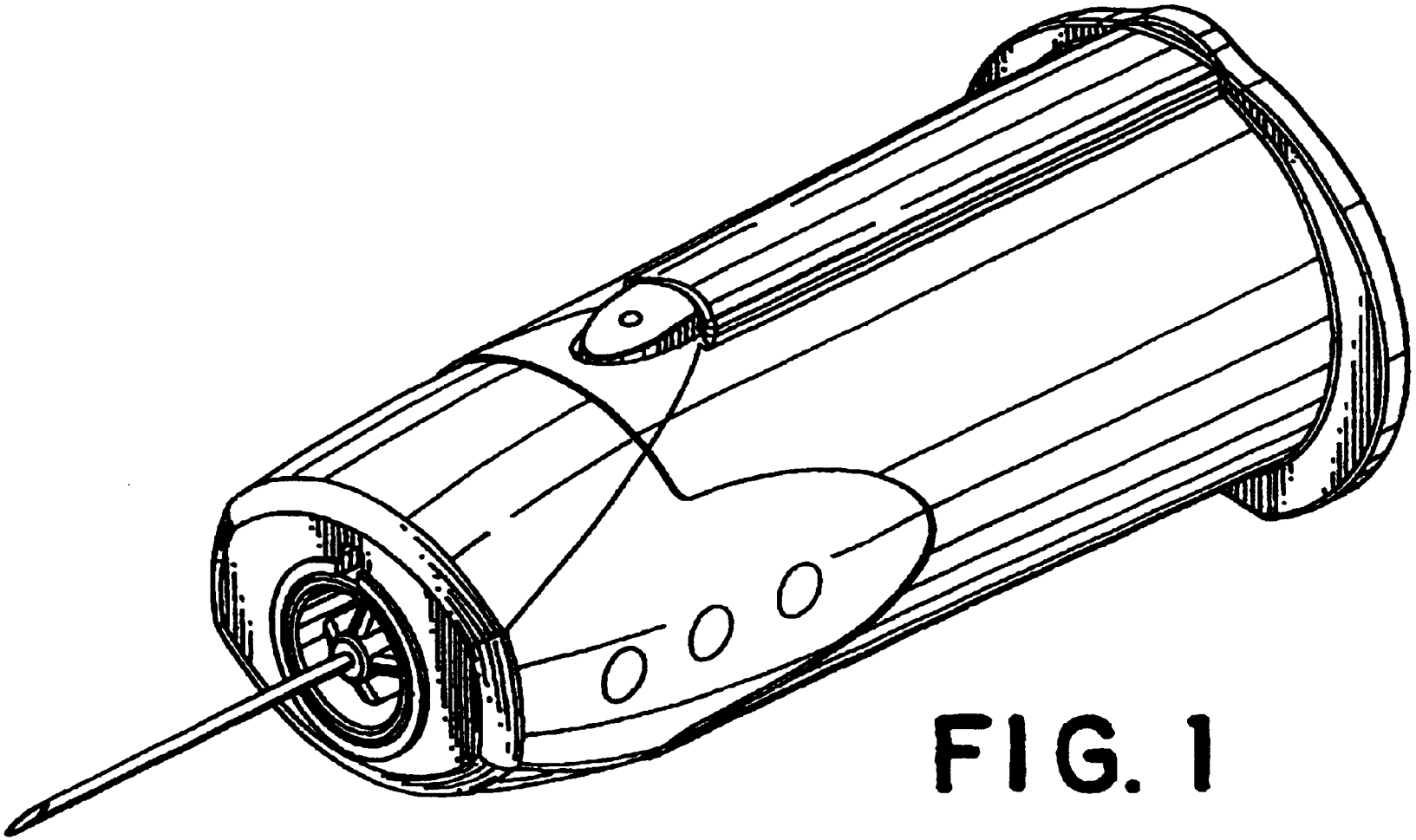
Figure 3:
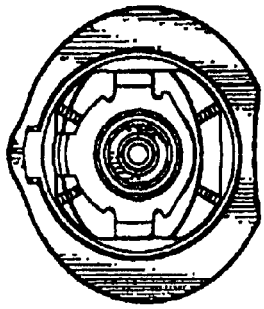
Figure 5:
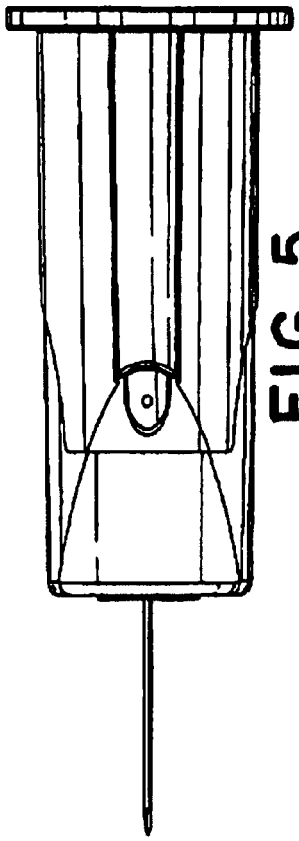
Figure 4:
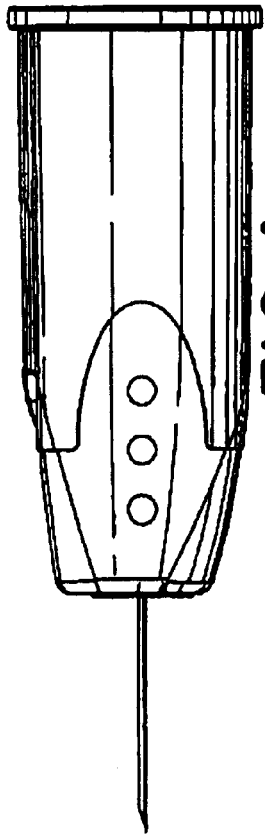
Figure 6:
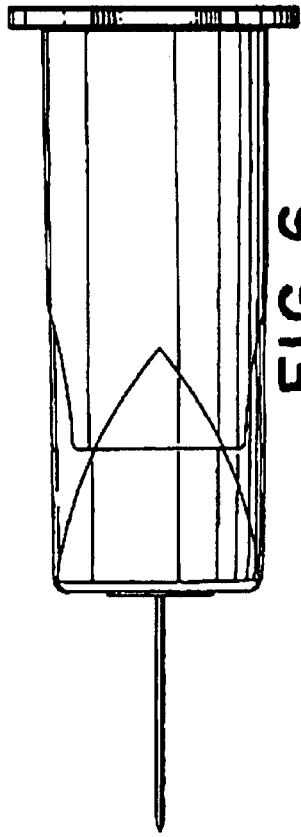
Figure 2:
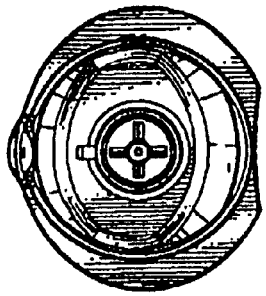

Matter enclosed in heavy brackets [ ] appears in the original patent, but forms no part of this reissue; matter printed in italics indicates the additions made by reissue.